United States Patent
Qi

(10) Patent No.: US 10,215,122 B2
(45) Date of Patent: Feb. 26, 2019

(54) METHOD AND APPARATUS FOR ACQUIRING ALTITUDE CORRECTION COEFFICIENT

(71) Applicants: CHERY AUTOMOBILE CO., LTD., Wuhu (CN); WUHU POWER-TECHNOLOGY RESEARCH CO., LTD., Wuhu (CN)

(72) Inventor: Keguang Qi, Wuhu (CN)

(73) Assignees: CHERY AUTOMOBILE CO., LTD., Anhui (CN); WUHU POWER-TECHNOLOGY RESEARCH CO., LTD., Anhui (CN)

(*) Notice: Subject to any disclaimer, the term of this patent is extended or adjusted under 35 U.S.C. 154(b) by 83 days.

(21) Appl. No.: 15/105,953

(22) PCT Filed: Nov. 24, 2014

(86) PCT No.: PCT/CN2014/092042
§ 371 (c)(1),
(2) Date: Jun. 17, 2016

(87) PCT Pub. No.: WO2015/096575
PCT Pub. Date: Jul. 2, 2015

(65) Prior Publication Data
US 2017/0298855 A1 Oct. 19, 2017

(30) Foreign Application Priority Data

Dec. 23, 2013 (CN) .......................... 2013 1 0719383

(51) Int. Cl.
*F02D 11/10* (2006.01)
*F02D 41/02* (2006.01)
*F02D 41/22* (2006.01)
*F02D 41/24* (2006.01)

(52) U.S. Cl.
CPC ........ *F02D 41/2451* (2013.01); *F02D 11/106* (2013.01); *F02D 41/021* (2013.01);
(Continued)

(58) Field of Classification Search
CPC .... F02D 41/222; F02D 11/106; F02D 41/021; F02D 2200/703; F02D 2200/0406; F02D 41/2429–41/2483
(Continued)

(56) References Cited

U.S. PATENT DOCUMENTS 4,600,993 A * 7/1986 Pauwels .................. G01L 23/24
123/406.49
2004/0216718 A1* 11/2004 Kolnnanovsky .......... F01L 9/04
123/346

(Continued)

FOREIGN PATENT DOCUMENTS

| CN | 101310106 A | 11/2008 |
| CN | 102022202 A | 4/2011 |

(Continued)

OTHER PUBLICATIONS

JP06294337—English Translation.*
(Continued)

*Primary Examiner* — Joseph J Dallo
*Assistant Examiner* — Scott A Reinbold
(74) *Attorney, Agent, or Firm* — Dilworth & Barrese, LLP.; Michael J. Musella, Esq.

(57) ABSTRACT

Disclosed are a method and apparatus for acquiring an altitude correction coefficient, comprising: acquiring an initial value of an altitude correction coefficient self-learning filter when a preset event occurs to a vehicle engine; evaluating whether the vehicle satisfies a preset self-learning enabling condition, in accordance with an engine rotation speed, a vehicle speed, and status information of designated
(Continued)

devices; enabling the altitude correction coefficient self-learning filter when the vehicle satisfies the preset self-learning enabling condition; determining an input of the altitude correction coefficient self-learning filter at least in accordance with operating states of a manifold pressure sensor and a stepping motor; and obtaining a current altitude correction coefficient by self-learning the altitude correction coefficient applying the altitude correction coefficient self-learning filter in accordance with the initial value of the altitude correction coefficient self-learning filter and the input of the altitude correction coefficient self-learning filter.

7 Claims, 9 Drawing Sheets

(52) U.S. Cl.
CPC ....... *F02D 41/222* (2013.01); *F02D 41/2438* (2013.01); *F02D 41/2474* (2013.01); *F02D 41/22* (2013.01); *F02D 2200/0406* (2013.01); *F02D 2200/70* (2013.01); *F02D 2200/703* (2013.01)

(58) Field of Classification Search
USPC .......................................................... 701/102
See application file for complete search history.

(56) References Cited

U.S. PATENT DOCUMENTS

2008/0254938 A1  10/2008  Sladek
2009/0076703 A1   3/2009  Wiggins et al.

FOREIGN PATENT DOCUMENTS

| | | | |
|---|---|---|---|
| CN | 202023643 | U | 11/2011 |
| CN | 102889148 | A | 1/2013 |
| CN | 103241099 | A | 8/2013 |
| CN | 103321690 | A | 9/2013 |
| CN | 201310719383 | * | 12/2013 |
| CN | 103644036 | A | 3/2014 |
| CN | 103711600 | * | 4/2014 |
| CN | 103711600 | A | 4/2014 |
| CN | 201310719383 | * | 4/2014 |
| DE | 102013208264 | A1 | 11/2013 |
| JP | S5823274 | A | 2/1983 |
| JP | S5963328 | A | 4/1984 |
| JP | H0237136 | A | 2/1990 |
| JP | 06294337 | * | 4/1993 |
| JP | H06294337 | A | 10/1994 |
| KR | 97044692 | A | 7/1997 |
| KR | 20020052320 | A | 7/2002 |

OTHER PUBLICATIONS

CN201310719383—English Translation.*
CN 103711600—English Translation.*
JP06294337—English Translation (Year: 1993).*
CN201310719383—English Translation (Year: 2014).*
CN 103711600—English Translation (Year: 2014).*
Search Report dated Feb. 17, 2015 from State Intellectual Property Office of the P.R. China.
Chinese Office Action dated Aug. 5, 2015.

* cited by examiner

METHOD AND APPARATUS FOR ACQUIRING ALTITUDE CORRECTION COEFFICIENT

This application claims priority of Chinese Patent Application No. 201310719383.3, filed before Chinese Patent Office on Dec. 23, 2013 and entitled "METHOD AND APPARATUS FOR ACQUIRING ALTITUDE CORRECTION COEFFICIENT", which is incorporated herein by reference in its entirety.

TECHNICAL FIELD

The present invention relates to the field of automobiles, and in particular, relates to a method and apparatus for acquiring an altitude correction coefficient.

BACKGROUND

In the field of automobile electronic control, air intake amount of an automobile engine is an important parameter affecting the idling issue. China is vast in territory, many regions are on the highlands, for example, such as Northwest Plateau, Yunnan-Guizhou Plateau, and Sichuan-Tibet Plateau, etc. Since air density decreases when altitude increases, to ensure a normal the automobile engine operation operates normally at different altitudes, the air intake amount of the working automobile engine needs to be adjusted based on the altitude correction coefficient. Therefore, the accuracy of the altitude correction coefficient is very critical.

At present, the altitude correction coefficient of an electronic control unit (ECU) may be acquired by means of modeling on a self-learning algorithm. However, due to lack of consideration of real time automobile driving conditions in the current algorithm, the altitude correction coefficient is inaccurate, resulting in an inaccurate air intake amount of the working automobile engine. Therefore, a method for acquiring the ECU altitude correction coefficient adapting taking in account of complicated real time automobile driving conditions is highly desired.

SUMMARY

To solve the problems in the related arts, embodiments of the present invention provide a method and apparatus for acquiring an altitude correction coefficient. The techniques in the method and apparatus are as follows:

In one aspect, the present invention provides a method for acquiring an altitude correction coefficient, wherein the method includes:

acquiring an initial value of an altitude correction coefficient self-learning filter when a preset event occurs to a vehicle engine, the preset event includes a power-off event, a power-on event, and an unexpected power-down event;

evaluating whether the vehicle satisfies a preset self-learning enabling condition, in accordance with an engine rotation speed, a vehicle speed, and status information of designated devices;

enabling the altitude correction coefficient self-learning filter when the vehicle satisfies the preset self-learning condition;

determining an input of the altitude correction coefficient self-learning filter at least in accordance with operating states of a manifold pressure sensor and a stepping motor; and obtaining a current altitude correction coefficient by self-learning the altitude correction coefficient applying the altitude correction coefficient self-learning filter in accordance with the initial value of the altitude correction coefficient self-learning filter and the input of the altitude correction coefficient self-learning filter.

In another aspect, the present invention provides an apparatus for acquiring an altitude correction coefficient, wherein the apparatus includes:

an initial value acquiring module, acquiring an initial value of an altitude correction coefficient self-learning filter when a preset event occurs to a vehicle engine, the preset event includes a power-off event, a power-on event, and an unexpected power-down event;

an enabling module, evaluating whether the vehicle satisfies a preset self-learning enabling condition, in accordance with an engine rotation speed, a vehicle speed, and status information of designated devices, and enabling the altitude correction coefficient self-learning filter when the vehicle satisfies the preset self-learning enabling condition;

an input determining module, determining an input of the altitude correction coefficient self-learning filter at least in accordance with operating states of a manifold pressure sensor and a stepping motor; and a self-learning module, obtaining a current altitude correction coefficient by self-learning the altitude correction coefficient applying the altitude correction coefficient self-learning filter, in accordance with the initial value of the altitude correction coefficient self-learning filter and the input of the altitude correction coefficient self-learning filter.

The techniques in the embodiments of the present invention provide following benefits:

optimizing the engine rotation speed procedure with consideration of the power-on self-learning function and unexpected power-down solution, and acquiring the initial value in the initialization process of the altitude correction coefficient self-learning filter; improving the accuracy of the altitude correction coefficient and the idling stability, by avoiding unfavorable altitude self-learning conditions in the enabling process, and considering the real time running conditions of certain devices during the determination of the input of the altitude correction coefficient self-learning filter; and solving the problem of inaccurate altitude correction coefficient due to complexity of the real time scenarios by consideration of real time scenarios during drive of a vehicle, resulting in improvement of the accuracy of the altitude correction coefficient.

BRIEF DESCRIPTION OF THE DRAWINGS

To better describe the techniques in the embodiments of the present invention, the enclosed drawings for illustrating the embodiments of the present invention are briefly described below. Apparently, the enclosed drawings in the following description illustrate only some embodiments of the present invention, and persons of ordinary skills in the arts may derive additional drawings based on the enclosed drawings without any creative efforts.

DETAILED DESCRIPTION

To better describe the objectives, technical solutions, and advantages of the present invention clearer, the embodiments of the present invention are described in details below with reference to the enclosed drawings.

Figure 1:
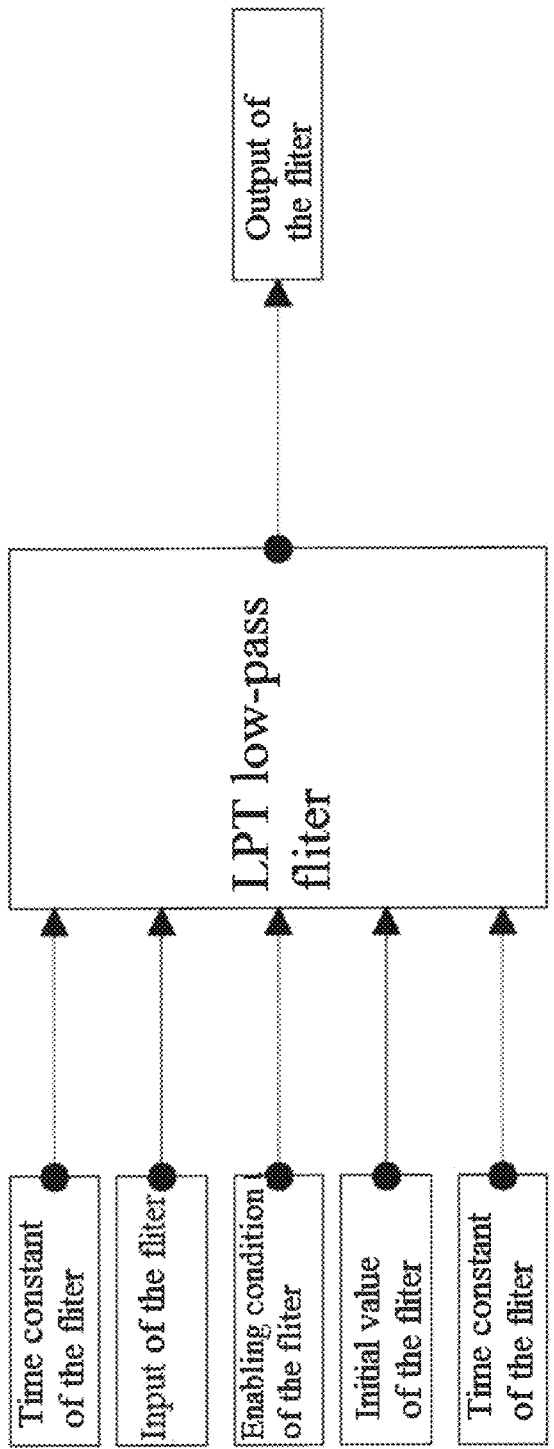
FIG. 1 is a schematic of an altitude self-learning correction coefficient algorithm model in accordance with an embodiment of the present invention.

For better understanding of an ECU altitude self-learning correction coefficient algorithm model of the disclosure, as illustrated in FIG. 1, the altitude self-learning correction coefficient algorithm model can include an altitude correction coefficient self-learning filter, which is a low-pass filter. The inputs of the altitude correction coefficient self-learning filter can include a filter time constant, an input value, an initial value, an initial condition, and an enabling condition. The outputs of the altitude correction coefficient self-learning filter can include an ambient pressure. The altitude correction coefficient is the quotient of the ambient pressure divided by the standard atmospheric pressure (one atmospheric pressure).

Formulas of the altitude correction coefficient self-learning filter are as follows: Formula of the filter:

$$Output(new)=Output(old)+\{Input-Output(old)\} \times dT/T,$$

wherein Output(new) is a current output of the filter, Output(old) is a previous output of the filter, Input is an input of the altitude correction coefficient self-learning filter, dT is a calculation period of the filter, and T is a filter time constant.

Figure 2:
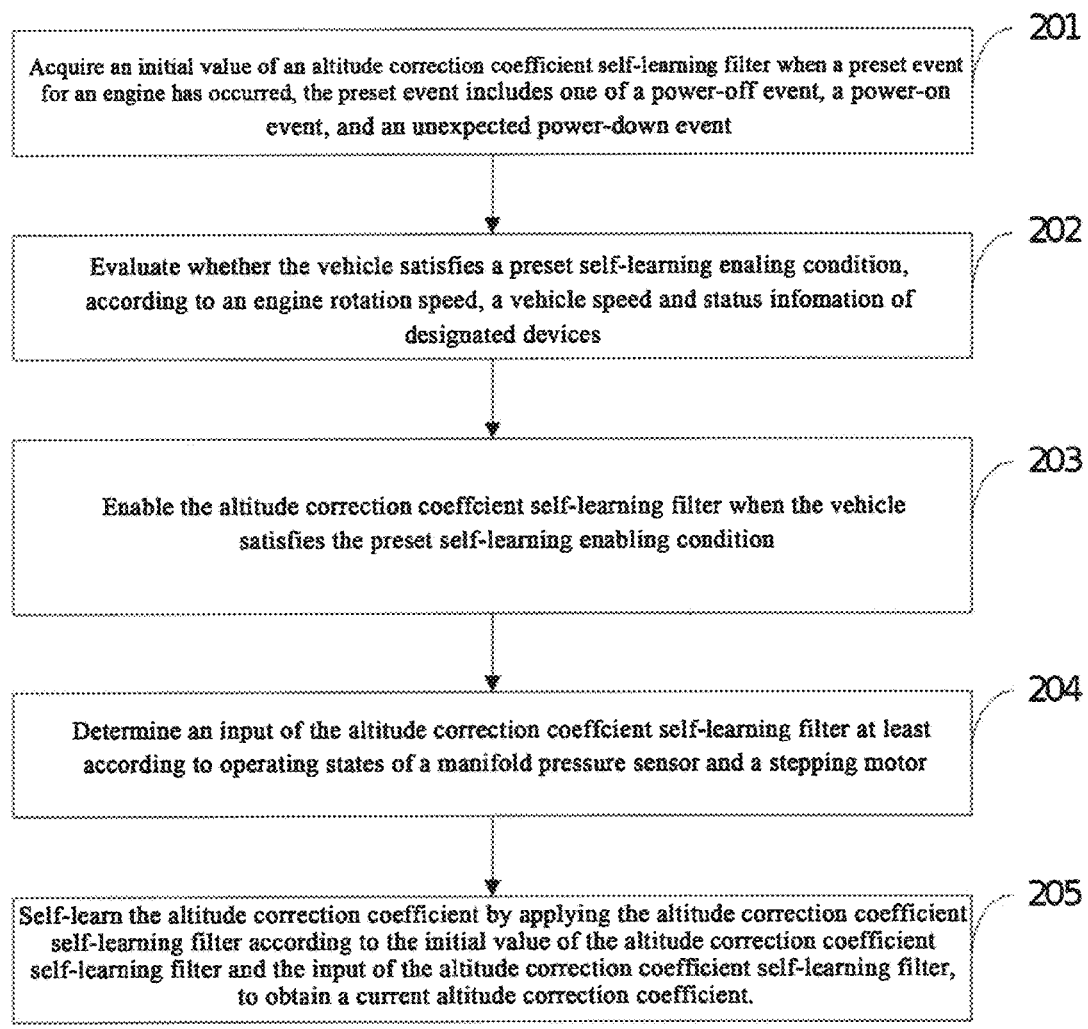
FIG. 2 is a flowchart of a method for acquiring an altitude correction coefficient in accordance with an embodiment of the present invention.

FIG. 2 is a flowchart of a method for acquiring an altitude correction coefficient in accordance with an embodiment of the present invention. As illustrated in FIG. 2, the method can include the following steps:

201: acquiring the initial value of the altitude correction coefficient self-learning filter when a preset event occurs to a vehicle engine, the preset event including a power-off event, a power-on event, and an unexpected power-down event;

202: evaluating whether the vehicle satisfies a preset self-learning enabling condition, according to an engine rotation speed, a vehicle speed, and status information of designated devices;

203: enabling the altitude correction coefficient self-learning filter when the vehicle satisfies the preset self-learning enabling condition;

204: determining the input of the altitude correction coefficient self-learning filter at least in accordance with operating status of a manifold pressure sensor and a stepping motor; and

205: obtaining the current altitude correction coefficient, by self-learning the altitude correction coefficient applying the altitude correction coefficient self-learning filter in accordance with the initial value and inputs of the altitude correction coefficient self-learning filter.

The embodiments of the present invention provide a method including the following effects: optimizing the engine rotation speed procedure with consideration of the power-on self-learning function and unexpected power-down solution, and acquiring the initial value in the initialization process of the altitude correction coefficient self-learning filter; improving the accuracy of the altitude correction coefficient and the idling stability, by avoiding unfavorable altitude self-learning conditions in the enabling process, and taking the real time running conditions of certain devices into consideration during the determination of the input of the altitude correction coefficient self-learning filter; and solving the problem of inaccurate altitude correction coefficient due to complexity of the real time scenarios by consideration of real time scenarios during drive of a vehicle.

Figure 3:
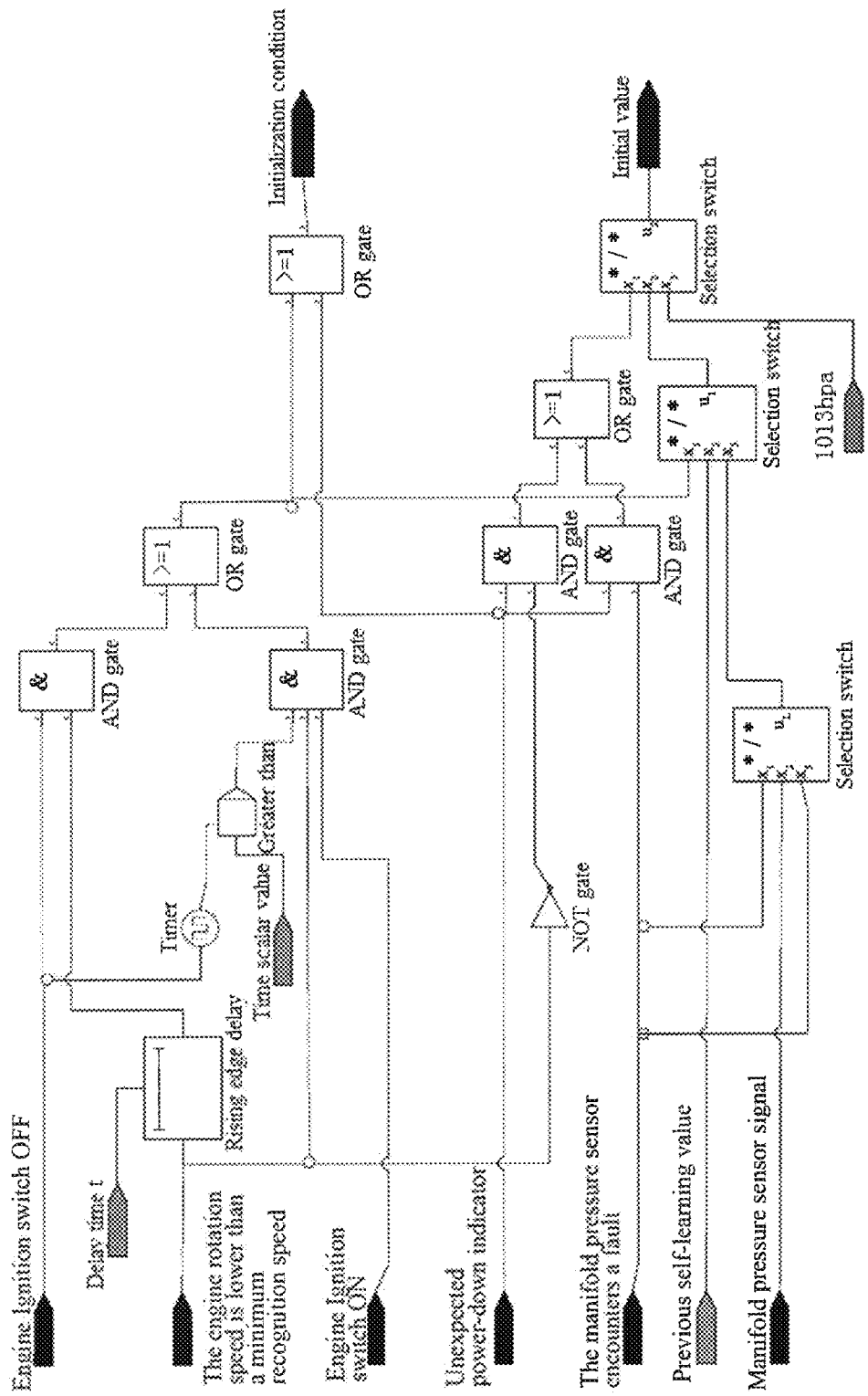
FIG. 3 is a schematic of logical diagram of an initialization algorithm of an altitude correction coefficient self-learning filter in accordance with an embodiment of the present invention.

FIG. 3 is schematic of a logical diagram of an initialization algorithm of an altitude correction coefficient self-learning filter. The initialization process of the altitude correction coefficient self-learning filter is described with reference to FIG. 3. To improve the accuracy of the altitude self-learning coefficient, the initialization of the altitude correction coefficient self-learning filter can take in consideration of numerous circumstances. Satisfaction of any one of the following circumstances can initialize the altitude correction coefficient self-learning filter.

Step 201 describes the process of acquiring the initial value of the altitude correction coefficient self-learning filter when the preset event, such as power-off event, power-on event, or unexpected power-down event, occurs to the vehicle engine respectively.

(1) When the preset event is the power-off event, acquiring the initial value of the altitude correction coefficient self-learning filter may be a power-off initialization. The power-off event refers to an engine ignition switch is off, or the vehicle engine is OFF.

The power-off initialization can set the initial value of the altitude correction coefficient self-learning filter to the value of the manifold pressure sensor, when the engine ignition switch is off, the engine rotation speed is lower than a minimum recognizable speed, and the manifold pressure sensor encounters no fault after a first preset delay. When the manifold pressure sensor encounters a fault, the initial value of the altitude correction coefficient self-learning filter is set to the previous output of the altitude correction coefficient self-learning filter after the first preset delay. The previous output of the altitude correction coefficient self-learning filter is a previous self-learning value as illustrated in FIG. 3. The first preset delay may be adjustable by a person skilled in the art. The first preset delay is not limited in the embodiments of the present invention.

With respect to the circumstance (1), when the vehicle engine stops running, the engine rotation speed can be decreased to lower than a minimum recognizable rotation speed. Thus, an indicator to identify the minimum recognizable rotation speed can change from 0 to 1. As illustrated in FIG. 3, the initialization starts after a rising edge delay of t seconds to ensure the engine rotation speed is 0 (zero). In this case, because the manifold pressure is the same as the atmospheric pressure, the initial value is the value from the manifold pressure sensor. When the manifold pressure sensor encounters a fault, the previous output of the altitude correction coefficient self-learning filter is the altitude self-learning pressure value of the running vehicle engine, and is the closest to an environmental pressure at this moment. Therefore, the initial value is the previous output of the altitude correction coefficient self-learning filter (the previous output is stored in an ECU).

(2) When the preset event is the power-on event, acquiring the initial value of the altitude correction coefficient self-learning filter may be a power-on initialization. The power-on event refers to the engine ignition switch is on or the vehicle engine is ON, which may be determined according to the status of the engine ignition switch as illustrated in FIG. 3.

The initial value of the altitude correction coefficient self-learning filter is the value of the manifold pressure sensor, when the engine ignition switch is on, the engine rotation speed is lower than the minimum recognizable rotation speed, and the manifold pressure sensor encounters no fault after an engine off time. The engine off time is greater than a second preset delay, which may be configured with a timer as illustrated in FIG. 3. When the manifold pressure sensor encounters a fault, the initial value is the previous output of the altitude correction coefficient self-learning filter.

The second preset delay may be adjustable by a person skilled in the art. The second preset delay is not limited in the embodiments of the present invention.

With respect to the circumstance (2), the initialization of the altitude correction coefficient self-learning filter with the consideration of the power-on initialization may prevent the starting and idling problems due to the altitude changes in the vehicle transportation. When the engine off time is greater than the second preset delay, the manifold pressure is substantially consistent with the environmental pressure to prevent a deviation problem caused by a quick startup.

(3) When the preset event is the unexpected power-down event, acquiring the initial value of the altitude correction coefficient self-learning filter may be the unexpected power-down initialization. The unexpected power-down initialization refers to reset of an unexpected power-down indicator.

When the vehicle engine is restored after an unexpected power-down, the manifold pressure sensor needs to be evaluated whether a malfunction occurs. The initial value of the altitude correction coefficient self-learning filter is the value of the manifold pressure sensor, when the manifold pressure sensor encounters no fault and the vehicle engine has no engine rotation speed. The initial value of the altitude correction coefficient self-learning filter is one standard atmospheric pressure when the manifold pressure sensor encounters no fault, and the vehicle engine has an engine rotation speed. The initial value of the altitude correction coefficient self-learning filter is one standard atmospheric pressure when the manifold pressure sensor encounters a fault.

With respect to the circumstance (3), the advantage of including an unexpected power-down self-learning is to prevent the vehicle malfunction caused by an initialization error due to a poor power connection or a manual battery unplugging.

The reason for the calculation of the altitude correction coefficient with taking account of the engine rotation speed is as follows: when a running vehicle engine has a poor power connection, the manifold pressure is very small, and the calculation of the altitude correction coefficient may have a great error if the manifold pressure is treated as the initialized value. Therefore, one standard atmospheric pressure is the most reasonable initial value of the altitude correction coefficient self-learning filter, because the unexpected vehicle power-down is less likely to happen at a high altitude.

Figure 4:
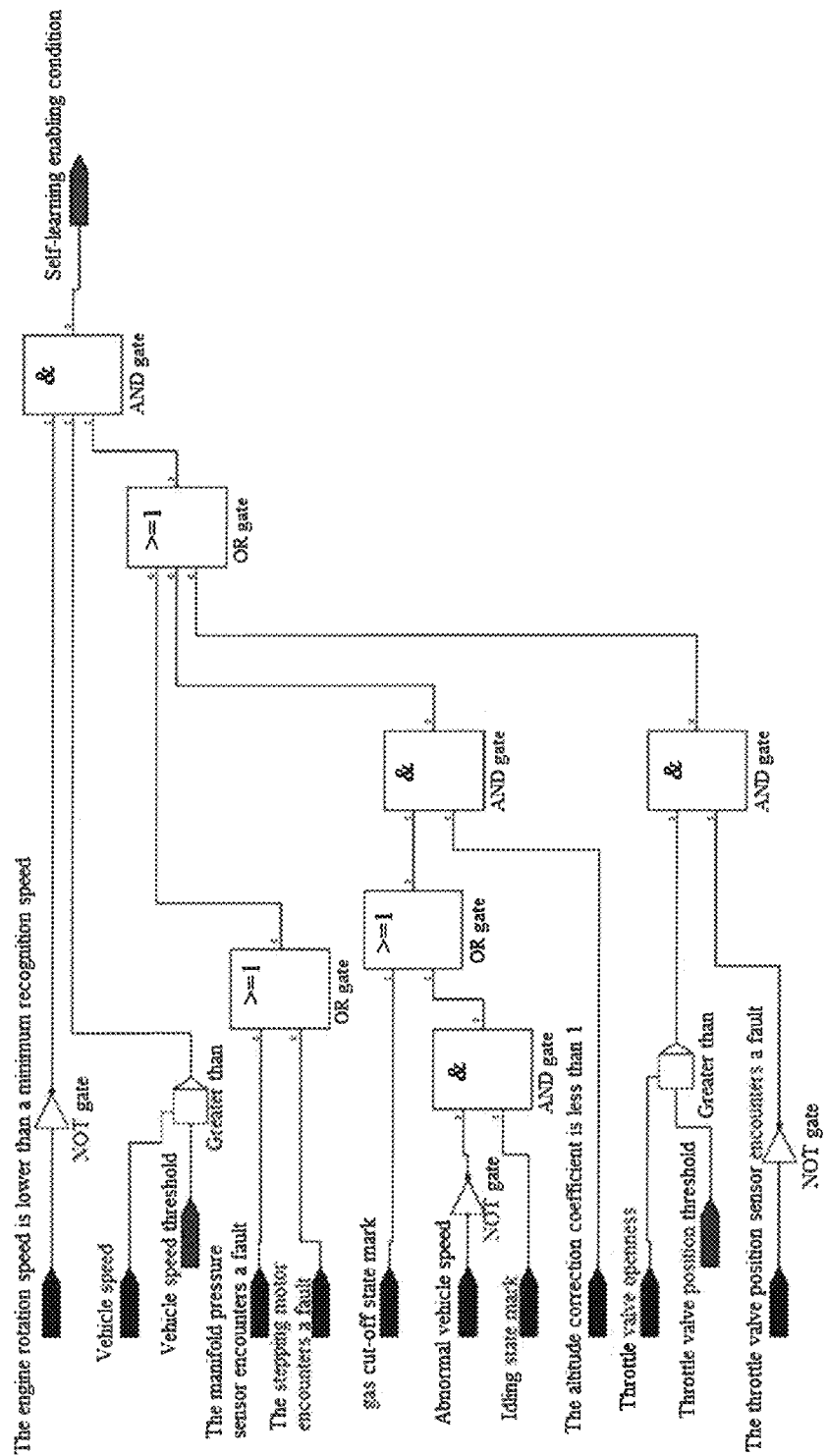
FIG. 4 is a schematic of basic logical diagram of a self-learning enabling condition in accordance with an embodiment of the present invention.

FIG. 4 is a schematic of a basic logical diagram of the self-learning enabling condition. The self-learning enabling condition of the altitude correction coefficient self-learning filter is described with reference to FIG. 4. To improve the accuracy of the altitude self-learning coefficient, the self-learning enabling condition of the altitude correction coefficient self-learning filter can take in consideration of numerous circumstances. Satisfaction of any one of the following circumstances can enable the altitude correction coefficient self-learning filter.

Evaluating whether the vehicle satisfies the preset self-learning enabling condition, according to the engine rotation speed, the vehicle speed, and the status information of designated devices, includes evaluating whether the vehicle satisfies the following three conditions simultaneously:

(1) The engine rotation speed is higher than the engine minimum recognizable rotation speed.

(2) The vehicle speed is higher than a preset threshold (a vehicle speed threshold as illustrated in FIG. 4). The preset threshold may be set by skilled person. For example, the preset threshold may be configured from 12 km/h to 15 km/h, and preferably to be 15 km/h.

(3) Any one of the following conditions (3.1) to (3.3) is satisfied.

(3.1) The manifold pressure sensor (which may be identified by a manifold pressure sensor fault identifier as illustrated in FIG. 4) or the stepping motor encounters a fault.

(3.2) The current altitude correction coefficient is less than 1, the vehicle is at a gas cut-off state (which may be identified by an gas cut-off state indicator as illustrated in FIG. 4) or an idling state (which may be identified by an idling state indicator as illustrated in FIG. 4), and the vehicle speed is normal (which may be identified by a vehicle speed fault as illustrated in FIG. 4).

(3.3) A throttle valve position (a throttle valve openness as illustrated in FIG. 4) is greater than an altitude self-learning threshold (which may be a throttle valve position threshold), and a throttle valve position sensor encounters no fault (which may be identified by a throttle valve position sensor fault as illustrated in FIG. 4).

When the above three conditions (1), (2), and (3) are satisfied simultaneously, the vehicle satisfies the preset self-learning enabling condition. The self-learning enabling condition needs to take in account of not only the accuracy of the altitude self-learning correction coefficient, but also the errors caused by damaged sensors at initialization. The self-learning algorithm can offset errors when take in account of the real time device status.

Figure 5:
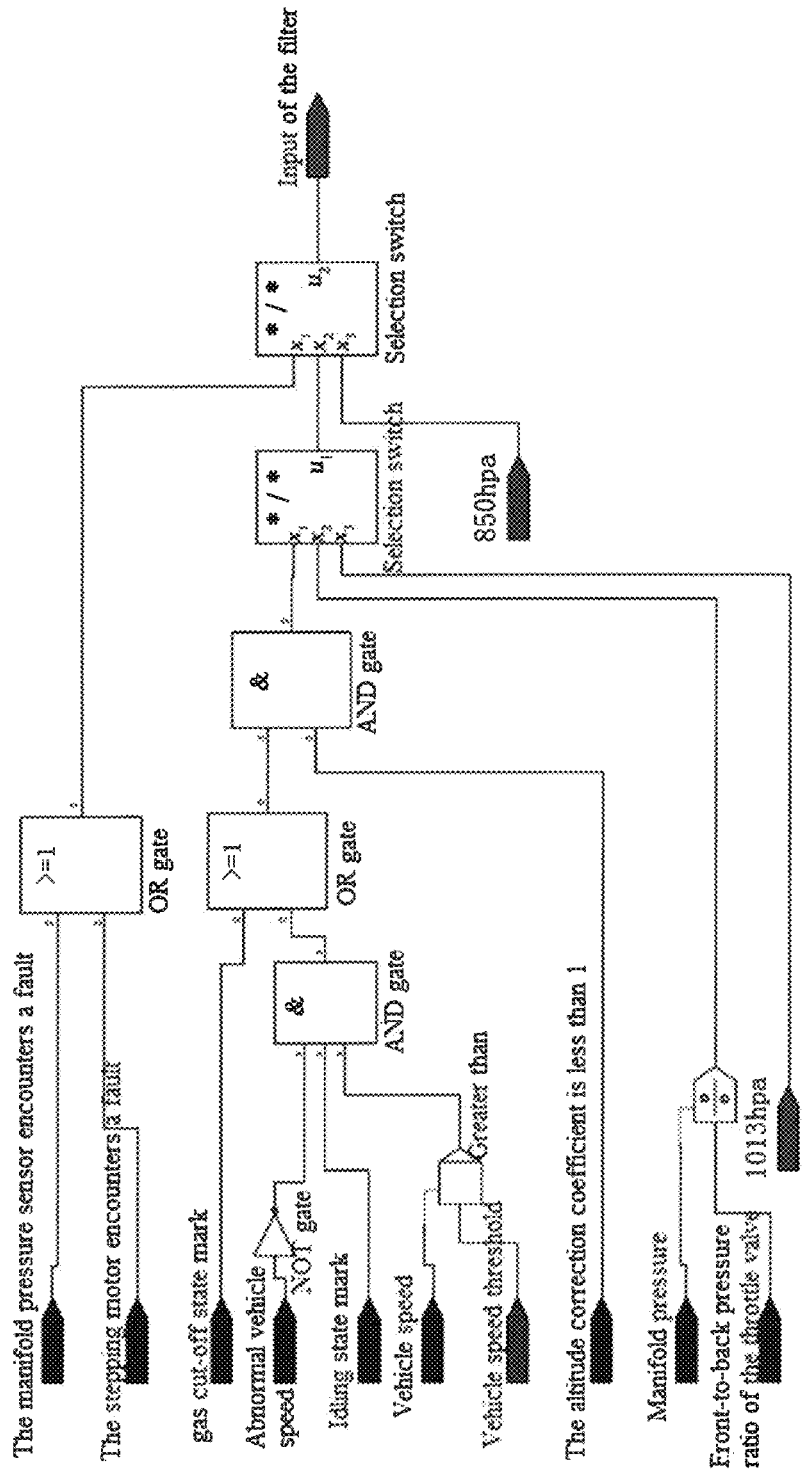
FIG. 5 is a schematic of basic logical diagram of an input algorithm of an altitude correction coefficient self-learning filter in accordance with an embodiment of the present invention.

FIG. 5 is a schematic of a basic logical diagram of an input algorithm of an altitude correction coefficient self-learning filter in accordance with an embodiment of the present invention. The acquisition of the input of the altitude correction coefficient self-learning filter is described with reference to FIG. 5. In order to calculate the altitude correction coefficient with the consideration of the real time driving scenarios, the input of the altitude correction coefficient self-learning filter must be determined with the consideration of real time device operation conditions.

Thus, according to at least operating status of the manifold pressure sensor and the stepping motor, determination of the input of the altitude correction coefficient self-learning filter can include, (4) When the manifold pressure sensor or the stepping motor encounters a fault, the input of the altitude correction coefficient self-learning filter is from 800 hpa to 900 hpa, preferably, the input of the altitude correction coefficient self-learning filter is 850 hpa.

With respect to the circumstance (4), when the manifold pressure sensor or the stepping motor encounters a fault, the manifold pressure and the front-to-back pressure ratio of the throttle valve are not reliable. The altitude correction coefficient self-learning filter input of 850 hpa can be applicable to both the normal altitude and the high altitude (closed-loop regulation coefficient of mixed gas may be corrected by 25%).

(5) When neither the manifold pressure sensor nor the stepping motor encounters a fault and the altitude correction coefficient is less than 1, the input of the altitude correction coefficient self-learning filter is 1013 hpa when any one of the following two second preset conditions is satisfied.

The two second preset conditions can include:
(5.1) The vehicle is at the gas cut-off state.
(5.2) The vehicle speed sensor encounters no fault, the idling state indicator is reset, and the vehicle speed is higher than the vehicle speed threshold.

With respect to the circumstance (5), when the vehicle is at the gas cut-off state or a sliding idling state, it is inaccurate to calculate the input of the altitude correction coefficient self-learning filter by dividing the manifold pressure by the front-to-back pressure ratio of the throttle valve, because the manifold vacuum degree is low. In this case, the input of the altitude correction coefficient self-learning filter is from 1000 hpa to 1100 hpa, preferably is 1013 hpa.

(6) When neither of the preset conditions of circumstance (5) is satisfied, the input of the altitude correction coefficient self-learning filter is the manifold pressure divided by the front-to-back pressure ratio of the throttle valve.

With respect to the circumstance (6), when none of the preset conditions in the circumstances (4) and (5) is satisfied, the input of the altitude correction coefficient self-learning filter is the quotient of the manifold pressure divided by the front-to-back pressure ratio of the throttle valve, wherein the quotient is the front pressure of the throttle valve in this case. The more accurate the front-to-back pressure ratio of the throttle valve is, the closer the front pressure of the throttle valve is to the environmental pressure. A normal input of the altitude correction coefficient self-learning filter is calculated in the circumstance (6).

The method provided by the embodiments of the present invention, can optimize the engine rotation speed procedure during the initialization process of the altitude correction coefficient self-learning filter through the manner of consideration of the power-on self-learning function and processing of unexpected power-down when acquiring the initial value, and can avoid unfavorable conditions of the altitude self-learning during the enabling process of the altitude correction coefficient self-learning filter. The input of the altitude correction coefficient self-learning filter is determined with consideration of real time running condition of certain devices. The techniques provided in the embodiments of the present invention offset the inaccuracy of the altitude correction coefficient caused by complexity of the real time scenarios when take in account of the real time vehicle running scenarios, resulting in improvement of idling stability.

Figure 6:
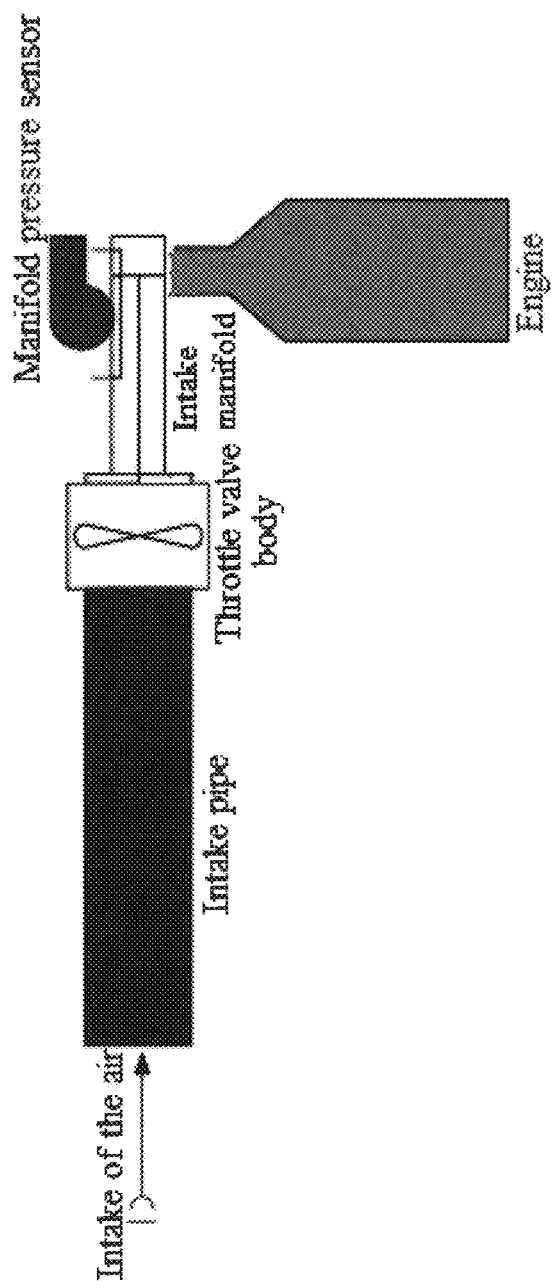
FIG. 6 is a schematic of a structure for altitude self-learning correction coefficient calculation in accordance with an embodiment of the present invention.

FIG. 6 is a schematic of a structure for altitude self-learning correction coefficient calculation in accordance with an embodiment of the present invention. The simulation process addressed above may be implemented in the ECU based on a structure illustrated in FIG. 6. The structure illustrated in FIG. 6 can include an intake pipe, a throttle valve body, an intake manifold, and the manifold pressure sensor for detecting the manifold pressure, wherein the intake manifold is connected to the vehicle engine.

Figure 7:
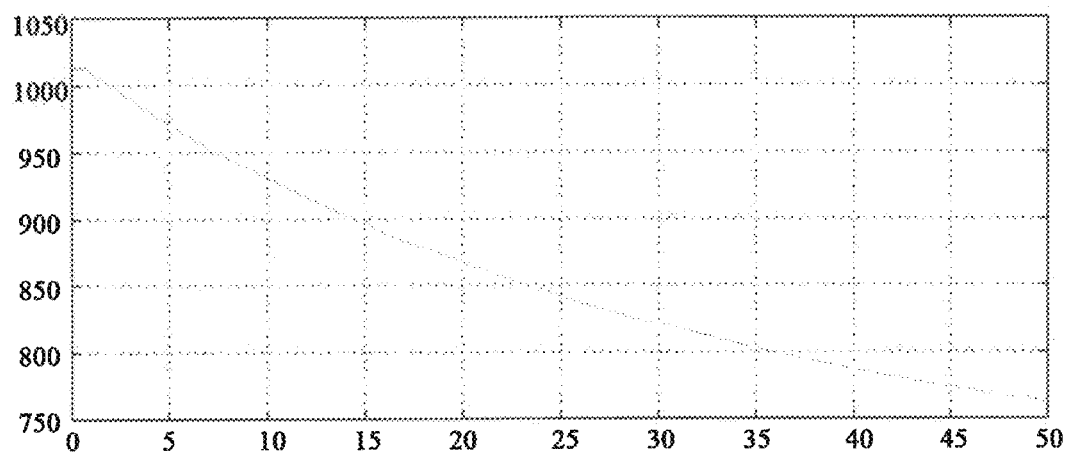
FIG. 7 is an illustration of a simulation result of an altitude self-learning correction coefficient algorithm in accordance with an embodiment of the present invention.

FIG. 7 is illustration of a simulation result of an altitude self-learning correction coefficient algorithm in accordance with an embodiment of the present invention. When the atmospheric pressure at flat is 1013 hpa, the current atmospheric pressure at a 2500-meter plateau is about 750 hpa. The altitude self-learning correction coefficient is the current atmospheric pressure divided by 1013 hpa.

Figure 8:
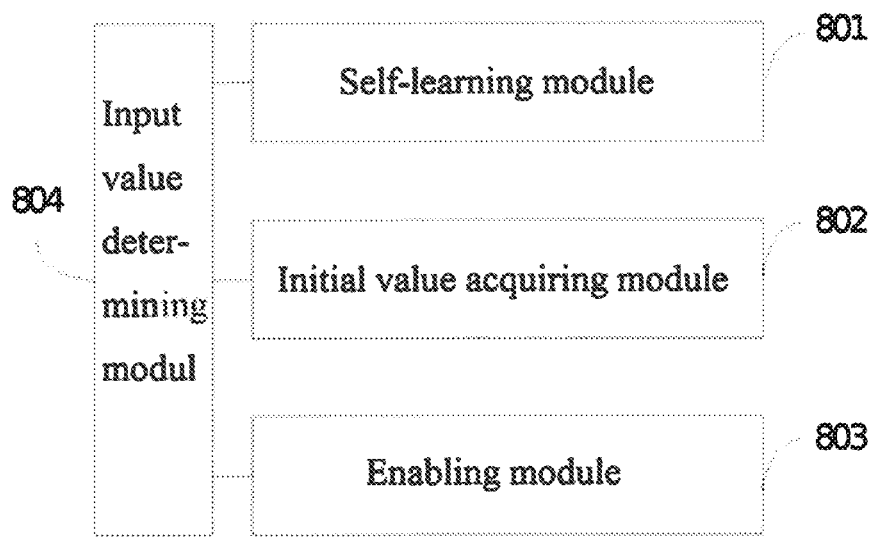
FIG. 8 is a schematic of an apparatus for acquiring an altitude correction coefficient in accordance with an embodiment of the present invention.
Figure 9:
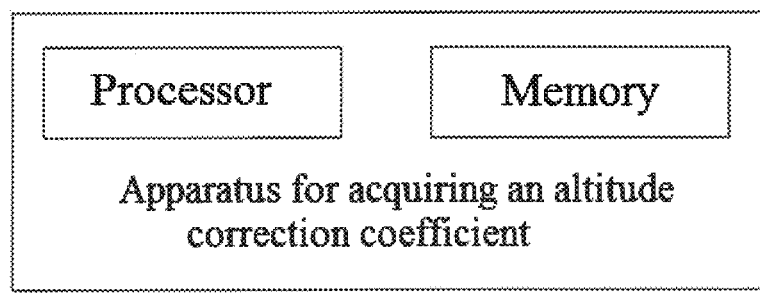
FIG. 9 is a schematic of an apparatus for acquiring an altitude correction coefficient in accordance with an embodiment of the present invention.

FIG. 8 is a structure schematic of an apparatus for acquiring an altitude correction coefficient in accordance with an embodiment of the present invention. Referring to FIG. 8, the apparatus includes:

an initial value acquiring module 801, acquiring an initial value of an altitude correction coefficient self-learning filter when a preset event occurs to a vehicle engine, the preset event includes a power-off event, a power-on event, and an unexpected power-down event;

an enabling module 802, evaluating whether the vehicle satisfies a preset self-learning enabling condition, in accordance with an engine rotation speed, a vehicle speed, and status information of designated devices, and enabling the altitude correction coefficient self-learning filter when the vehicle satisfies the preset self-learning enabling condition;

an input determining module 803, determining an input of the altitude correction coefficient self-learning filter at least in accordance with operating states of a manifold pressure sensor and a stepping motor; and a self-learning module 804, obtaining a current altitude correction coefficient by self-learning the altitude correction coefficient applying the altitude correction coefficient self-learning filter, in accordance with the initial value of the altitude correction coefficient self-learning filter and the input of the altitude correction coefficient self-learning filter.

Optionally, the initial value acquiring module 801 can be configured to:

evaluate whether the manifold pressure sensor encounters a fault after a first preset delay, when an engine ignition switch is off and the engine rotation speed is lower than a minimum recognizable rotation speed;

set the initial value of the altitude correction coefficient self-learning filter to a value of the manifold pressure sensor, when the manifold pressure sensor encounters no fault; and set the initial value of the altitude correction coefficient self-learning filter to a previous output of the altitude correction coefficient self-learning filter, when the manifold pressure sensor encounters a fault.

Optionally, the initial value acquiring module 801 can be configured to:

evaluate whether the manifold pressure sensor encounters a fault, when the engine ignition switch is on, the engine rotation speed is lower than a minimum recognizable rotation speed, and an engine off time is greater than a second preset delay;

set the initial value of the altitude correction coefficient self-learning filter to a value of the manifold pressure sensor, when the manifold pressure sensor encounters no fault; and set the initial value of the altitude correction coefficient self-learning filter to a previous output of the altitude correction coefficient self-learning filter, when the manifold pressure sensor encounters a fault.

Optionally, the initial value acquiring module 801 can be configured to:

evaluate whether the manifold pressure sensor encounters a fault when the vehicle engine is restored after an unexpected power-down;

set the initial value of the altitude correction coefficient self-learning filter to a value of the manifold pressure sensor, when the manifold pressure sensor encounters no fault and the vehicle engine has no engine rotation speed;

set the initial value of the altitude correction coefficient self-learning filter to one standard atmospheric pressure, when the manifold pressure sensor encounters no fault and the vehicle engine has the engine rotation speed; and set the initial value of the altitude correction coefficient self-learning filter to one standard atmospheric pressure, when the manifold pressure sensor encounters a fault.

Optionally, the enabling module 802 can evaluate whether the vehicle satisfies a preset self-learning enabling condition when the engine rotation speed is higher than a minimum recognizable rotation speed, the vehicle speed is higher than a preset threshold, and any one of first preset conditions is satisfied, wherein the first preset conditions includes:

the manifold pressure sensor or the stepping motor encounters a fault;

the current altitude correction coefficient is less than 1, the vehicle is at a gas cut-off state or an idling state, and the vehicle speed is normal; and a throttle valve position is greater than an altitude self-learning threshold, and a throttle valve position sensor encounters no fault.

Optionally, the input determining module 803 can optimize the input of the altitude correction coefficient self-learning filter to 850 hpa from a range of 800 hpa to 900 hpa, when the manifold pressure sensor or the stepping motor encounters a fault.

The input determining module 803 can further optimize the input of the altitude correction coefficient self-learning filter to 1013 hpa from a range of 1000 hpa to 1100 hpa, when the manifold pressure sensor or the stepping motor encounters no fault, the altitude correction coefficient is less than 1, and any one of the following two second preset conditions is satisfied. The two second preset conditions can include:

the vehicle is at the gas cut-off state; and the vehicle speed sensor encounters no fault, the idling state indicator is reset, and the vehicle speed is higher than the vehicle speed threshold.

The input value determining module 803 can further set the input of the altitude correction coefficient self-learning filter to the quotient of the manifold pressure divided by the front-to-back pressure ratio of a throttle valve, when neither of the preset conditions is satisfied.

Another embodiment of the present invention provides an apparatus acquiring an altitude correction coefficient. The apparatus can include:

a processor; and a memory storing instructions executed by the processor, wherein the instructions include:

acquiring an initial value of an altitude correction coefficient self-learning filter when a preset event occurs to a vehicle engine, the preset event including a power-off event, a power-on event and an unexpected power-down event;

evaluating whether the vehicle satisfies a preset self-learning enabling condition, according to an engine rotation speed, a vehicle speed, and status information of designated devices;

enabling the altitude correction coefficient self-learning filter when the vehicle satisfies the preset self-learning enabling condition;

determining an input of the altitude correction coefficient self-learning filter at least according to in accordance with operating states of a manifold pressure sensor and a stepping motor; and obtaining a current altitude correction coefficient by self-learning the altitude correction coefficient, applying the altitude correction coefficient self-learning filter in accordance with the initial value of the altitude correction coefficient self-learning filter and the input of the altitude correction coefficient self-learning filter.

The processor is further configured to execute the following instructions:

evaluating whether the manifold pressure sensor encounters a fault after a first preset delay, when an engine ignition switch is off and the engine rotation speed is lower than a minimum recognizable rotation speed;

setting the initial value of the altitude correction coefficient self-learning filter to a value of the manifold pressure sensor, when the manifold pressure sensor encounters no fault; and setting the initial value of the altitude correction coefficient self-learning filter to a previous output of the altitude correction coefficient self-learning filter, when the manifold pressure sensor encounters a fault.

The processor is further configured to execute the following instructions:

evaluating whether the manifold pressure sensor encounters a fault, when the engine ignition switch is on, the engine rotation speed is lower than a minimum recognizable rotation speed, and an engine off time is greater than a second preset delay;

setting the initial value of the altitude correction coefficient self-learning filter to a value of the manifold pressure sensor, when the manifold pressure sensor encounters no fault; and setting the initial value of the altitude correction coefficient self-learning filter to a previous output of the altitude correction coefficient self-learning filter, when the manifold pressure sensor encounters a fault.

The processor is further configured to execute the following instructions:

evaluating whether the manifold pressure sensor encounters a fault when the vehicle engine is restored after an unexpected power-down;

setting the initial value of the altitude correction coefficient self-learning filter to a value of the manifold pressure sensor, when the manifold pressure sensor encounters no fault and the vehicle engine has no engine rotation speed;

setting the initial value of the altitude correction coefficient self-learning filter to one standard atmospheric pressure, when the manifold pressure sensor encounters no fault and the vehicle engine has the engine rotation speed; and setting the initial value of the altitude correction coefficient self-learning filter to one standard atmospheric pressure, when the manifold pressure sensor encounters a fault.

The process is further configured to execute the following instructions:

determining the vehicle satisfies a preset self-learning enabling condition when the engine rotation speed is higher than a minimum recognizable rotation speed, the vehicle speed is higher than a preset threshold, and any one of first preset conditions is satisfied, wherein the first preset conditions includes:

the manifold pressure sensor or the stepping motor encounters a fault;

the current altitude correction coefficient is less than 1, the vehicle is at a gas cut-off state or an idling state, and the vehicle speed is normal; and a throttle valve position is greater than an altitude self-learning threshold, and a throttle valve position sensor encounters no fault.

The process is further configured to execute the following instructions:

setting the input of the altitude correction coefficient self-learning filter to 800 hpa-900 hpa, when the manifold pressure sensor or the stepping motor encounters a fault;

setting the input of altitude correction coefficient self-learning filter to 1000 hpa-1100 hpa, when the manifold pressure sensor and the stepping motor encounters no fault, the altitude correction coefficient is less than 1, and any one of the following two second preset conditions is satisfied. The two second preset conditions can include:

the vehicle is at the gas cut-off state; and the vehicle speed sensor encounters no fault, the idling state indicator is reset, and the vehicle speed is higher than the vehicle speed threshold;

setting the input of the altitude correction coefficient self-learning filter to the quotient of the manifold pressure divided by the front-to-back pressure ratio of a throttle valve, when neither of the preset conditions is satisfied.

The apparatus provided in the embodiments of the present invention, can optimize the engine rotation speed procedure during the initialization process of the altitude correction coefficient self-learning filter through the manner of consideration of the power-on self-learning function and processing of unexpected power-down when acquiring the initial value, and can avoid unfavorable conditions of the altitude self-learning during the enabling process of the altitude correction coefficient self-learning filter. The input of the altitude correction coefficient self-learning filter is determined with consideration of real time running condition of certain devices. The techniques disclosed in the embodiments of the present invention offset the inaccuracy of the altitude correction coefficient caused by complexity of the real time scenarios, when take in account of the real time vehicle running scenarios, resulting in improvement of the idling stability.

Another embodiment of the present invention provides a non-transitory computer readable storage medium including instructions stored therein, such as a memory including instructions executed by the processor to implement the method of the embodiments of the present invention. For example, the non-transitory computer-readable storage medium can include a ROM, a random access memory (RAM), a compact disc read-only memory (CD-ROM), a magnetic tape, a floppy disc, and an optical data storage device.

The processor can execute the instructions stored in the storage medium to implement the method for acquiring the altitude correction coefficient. The method can include:

acquiring the initial value of the altitude correction coefficient self-learning filter when a preset event occurs to a vehicle engine, the preset event including a power-off event, a power-on event, and an unexpected power-down event;

evaluating whether the vehicle satisfies a preset self-learning enabling condition, according to an engine rotation speed, a vehicle speed, and status information of designated devices;

enabling the altitude correction coefficient self-learning filter when the vehicle satisfies the preset self-learning enabling condition;

determining the input of the altitude correction coefficient self-learning filter at least in accordance with operating status of a manifold pressure sensor and a stepping motor; and obtaining the current altitude correction coefficient, by self-learning the altitude correction coefficient applying the altitude correction coefficient self-learning filter in accordance with the initial value and inputs of the altitude correction coefficient self-learning filter.

Above describes a first implementation of the method provided in the embodiments of the present invention. According to the first implementation, in a second implementation, the memory can further include instructions performing the following operations:

evaluating whether the manifold pressure sensor encounters a fault when the engine ignition switch is off, the engine rotation speed is lower than a minimum recognizable speed after a first preset delay;

setting the initial value of the altitude correction coefficient self-learning filter to the value of the manifold pressure sensor, when the manifold pressure sensor operates normally after a first preset delay;

setting the initial value of the altitude correction coefficient self-learning filter to the previous output of the altitude correction coefficient self-learning filter, when the manifold pressure sensor operates abnormally after the first preset delay.

According to the first implementation, in a third implementation, the memory can further include instructions performing the following operations:

evaluating whether the manifold pressure sensor encounter fault, when the engine ignition switch is on and the engine rotation speed is lower than the minimum recognizable rotation speed;

setting the initial value of the altitude correction coefficient self-learning filter to the value of, when the manifold pressure sensor runs normally;

setting the initial value of the altitude correction coefficient self-learning filter to the previous output of the altitude correction coefficient self-learning filter, when the manifold pressure sensor encounters a fault.

According to the first implementation, in a fourth implementation, the memory can further include instructions performing the following operations:

evaluating whether the manifold pressure sensor encounters a fault, when the vehicle engine is restored after an unexpected power-down;

setting the initial value of the altitude correction coefficient self-learning filter to the value of the manifold pressure sensor, when the manifold pressure sensor operates normally and the vehicle engine has no engine rotation speed;

setting the initial value of the altitude correction coefficient self-learning filter to one standard atmospheric pressure, when the manifold pressure sensor encounters no malfunction and the vehicle engine has an engine rotation speed;

setting the initial value of the altitude correction coefficient self-learning filter to one standard atmospheric pressure, when the manifold pressure sensor encounters a malfunction.

According to the first implementation, in a fifth implementation, the memory can further include instructions performing the following operations:

determine the vehicle satisfies the preset self-learning enabling conditions, when the engine rotation speed is higher than the minimum recognizable rotation speed, the vehicle speed is higher than the preset threshold, and any one of the following first preset conditions is satisfied.

The first preset conditions can include:

the manifold pressure sensor or the stepping motor encounters a fault;

the current altitude correction coefficient is less than 1, the vehicle is at the an gas cut-off state or the idling state, and the vehicle speed is normal; and the throttle valve position is greater than the altitude self-learning threshold, and the throttle valve position sensor encounters no fault.

According to the first implementation, in a sixth implementation, the memory can further include instructions performing the following operations:

optimizing the input of the altitude correction coefficient self-learning filter to 850 hpa from the range of 800 hpa-900 hpa, when the manifold pressure sensor or the stepping motor encounters a fault;

optimizing the input of altitude correction coefficient self-learning filter to 1013 hpa from a range of 1000 hpa-1100 hpa, when the manifold pressure sensor and the stepping motor encounters no fault, the altitude correction coefficient is less than 1, and any one of the following two second preset conditions is satisfied. The two second preset conditions can include: the vehicle is at the gas cut-off state; and the vehicle speed sensor encounters no fault, the idling state indicator is reset, and the vehicle speed is higher than the vehicle speed threshold; and setting the input of the altitude correction coefficient self-learning filter to the quotient of the manifold pressure divided by the front-to-back pressure ratio of a throttle valve, when neither of the two preset conditions is satisfied.

The non-transitory computer-readable storage medium provided in the embodiments of the present invention, can optimize the engine rotation speed procedure during the initialization process of the altitude correction coefficient self-learning filter through the manner of consideration of the power-on self-learning function and processing of unexpected power-down when acquiring the initial value, and can avoid unfavorable conditions of the altitude self-learning during the enabling process of the altitude correction coefficient self-learning filter. The input of the altitude correction coefficient self-learning filter is determined with consideration of real time running condition of certain devices. The techniques disclosed in the embodiments of the present invention offset the inaccuracy of the altitude correction coefficient caused by complexity of the real time scenarios, when take in account of the real time vehicle running scenarios, resulting in improvement of the idling stability.

The apparatus for acquiring the altitude correction coefficient in the embodiments of the present invention, are divided by the above functional modules for example but not limited to the above functional modules. The above functions may be implemented by different functional modules as needed. The apparatus can be divided into different functional modules to implement all or part of the functions. The method for acquiring an altitude correction coefficient in the embodiments of the present invention shares the same concept with the apparatus for acquiring an altitude correction coefficient in the embodiments of the present invention. The details of the implementation are described in the method embodiments.

Persons of ordinary skill in the art should understand that all or part of steps of the methods in the embodiments of the present invention may be implemented by hardware or hardware following instructions of programs. The programs may be stored in a non-transitory computer-readable storage medium. The storage medium may be a read only memory, a magnetic disk, or a compact disc-read only memory.

The present invention is described by, but not limit to, the above preferred embodiments. Any modification, alternative, or improvement on the principle of the present invention should fall within the protection scope of the present invention.

What is claimed is:

1. A method for acquiring an altitude correction coefficient, comprising:

acquiring an initial value of an altitude correction coefficient self-learning filter when a preset event for an engine has occurred, the preset event includes one of a power-off event, a power-on event, and an unexpected power-down event;

evaluating whether a vehicle satisfies a preset self-learning enabling condition, in accordance with an engine rotation speed, a vehicle speed, and status information of designated devices, wherein the preset self-learning enabling condition is a condition of the vehicle in terms of the engine rotation speed, the vehicle speed, and the status information of designated devices;

enabling the altitude correction coefficient self-learning filter when the vehicle satisfies the preset self-learning enabling condition;

determining an input of the altitude correction coefficient self-learning filter at least in accordance with operating states of a manifold pressure sensor and a stepping motor; and obtaining a current altitude correction coefficient by self-learning the altitude correction coefficient applying the altitude correction coefficient self-learning filter in accordance with the initial value of the altitude correction coefficient self-learning filter and the input of the altitude correction coefficient self-learning filter;

wherein, when the power-off event has occurred, acquiring the initial value of the altitude correction coefficient self-learning filter includes: evaluating whether the manifold pressure sensor encounters a fault after a first preset delay, when an engine ignition switch is off and the engine rotation speed is lower than a minimum recognizable rotation speed; setting the initial value of the altitude correction coefficient self-learning filter to a value of the manifold pressure sensor, when the manifold pressure sensor encounters no fault; and setting the initial value of the altitude correction coefficient self-learning filter to a previous output of the altitude correction coefficient self-learning filter, when the manifold pressure sensor encounters a fault;

wherein, when the power-on event has occurred, acquiring the initial value of the altitude correction coefficient self-learning filter includes: evaluating whether the manifold pressure sensor encounters a fault after a first preset delay, when an engine ignition switch is off and the engine rotation speed is lower than a minimum recognizable rotation speed; setting the initial value of the altitude correction coefficient self-learning filter to a value of the manifold pressure sensor, when the manifold pressure sensor encounters no fault; and setting the initial value of the altitude correction coefficient self-learning filter to a previous output of the altitude correction coefficient self-learning filter, when the manifold pressure sensor encounters a fault;

wherein, when the unexpected power-down event has occurred, acquiring the initial value of the altitude correction coefficient self-learning filter includes: evaluating whether the manifold pressure sensor encounters a fault when the engine is restored after the unexpected power-down event; setting the initial value of the altitude correction coefficient self-learning filter to a value of the manifold pressure sensor, when the manifold pressure sensor encounters no fault and rotation speed of the engine is zero; setting the initial value of the altitude correction coefficient self-learning filter to one standard atmospheric pressure, when the manifold pressure sensor encounters no fault and the rotation speed of the engine is not zero; and setting the initial value of the altitude correction coefficient self-learning filter to one standard atmospheric pressure, when the manifold pressure sensor encounters a fault.

2. The method according to claim 1, wherein evaluating whether the vehicle satisfies a preset self-learning enabling condition in accordance with the engine rotation speed, the vehicle speed, and status information of designated devices includes: evaluating whether the vehicle satisfies the preset self-learning enabling condition when the engine rotation speed is higher than a minimum recognizable rotation speed, the vehicle speed is higher than a preset threshold, and any one of first preset conditions is satisfied, wherein the first preset conditions include:
the manifold pressure sensor or the stepping motor encounters a fault;
the current altitude correction coefficient is less than 1, the vehicle is at a gas cut-off state or an idling state, and the vehicle speed is normal; and
a throttle valve position is greater than an altitude self-learning threshold, and a throttle valve position sensor encounters no fault.

3. The method according to claim 1, wherein determining the input of the altitude correction coefficient self-learning filter at least in accordance with operating states of the manifold pressure sensor and the stepping motor includes:
setting the input of the altitude correction coefficient self-learning filter to 800 hpa-900 hpa, when the manifold pressure sensor or the stepping motor encounters a fault;
setting the input of the altitude correction coefficient self-learning filter to 1000 hpa-1100 hpa, when the manifold pressure sensor and the stepping motor encounters no fault, the current altitude correction coefficient is less than 1, and any one of two second preset conditions is satisfied, wherein the two second preset conditions include: the vehicle is at a gas cut-off state; and a vehicle speed sensor encounters no fault, an idling state indicator is reset, and the vehicle speed is higher than a vehicle speed threshold; and
setting the input of the altitude correction coefficient self-learning filter to the quotient of a manifold pressure divided by a front-to-back pressure ratio of a throttle valve when none of the two second preset conditions is satisfied.

4. An apparatus for acquiring an altitude correction coefficient, comprising:
an initial value acquiring module, acquiring an initial value of an altitude correction coefficient self-learning filter when a preset event for an engine has occurred, the preset event includes one of a power-off event, a power-on event, and an unexpected power-down event;
an enabling module, evaluating whether a vehicle satisfies a preset self-learning enabling condition, in accordance with an engine rotation speed, a vehicle speed, and status information of designated devices, wherein the preset self-learning enabling condition is a condition of the vehicle in terms of the engine rotation speed, the vehicle speed, and the status information of designated devices, and enabling the altitude correction coefficient self-learning filter when the vehicle satisfies the preset self-learning enabling condition;
an input determining module, determining an input of the altitude correction coefficient self-learning filter at least in accordance with operating states of a manifold pressure sensor and a stepping motor; and
a self-learning module, obtaining a current altitude correction coefficient by self-learning the altitude correction coefficient applying the altitude correction coefficient self-learning filter, in accordance with the initial value of the altitude correction coefficient self-learning filter and the input of the altitude correction coefficient self-learning filter;
wherein, when the power-off event has occurred, the initial value acquiring module is configured to: evaluate whether the manifold pressure sensor encounters a fault after a first preset delay, when an engine ignition switch is off and the engine rotation speed is lower than a minimum recognizable rotation speed; set the initial value of the altitude correction coefficient self-learning filter to a value of the manifold pressure sensor, when the manifold pressure sensor encounters no fault; and set the initial value of the altitude correction coefficient self-learning filter to a previous output of the altitude correction coefficient self-learning filter, when the manifold pressure sensor encounters a fault;
wherein, when the power-on event has occurred, the initial value acquiring module is configured to: evaluate whether the manifold pressure sensor encounters a fault, when an engine ignition switch is on, the engine rotation speed is lower than a minimum recognizable rotation speed, and an engine off time is greater than a second preset delay; set the initial value of the altitude correction coefficient self-learning filter to a value of the manifold pressure sensor, when the manifold pressure sensor encounters no fault; and set the initial value of the altitude correction coefficient self-learning filter to a previous output of the altitude correction coefficient self-learning filter, when the manifold pressure sensor encounters a fault;
wherein, when the unexpected power-down event has occurred, the initial value acquiring module is configured to: evaluate whether the manifold pressure sensor encounters a fault when the engine is restored after the unexpected power-down event; set the initial value of the altitude correction coefficient self-learning filter to a value of the manifold pressure sensor, when the manifold pressure sensor encounters no fault and rotation speed of engine is zero; set the initial value of the altitude correction coefficient self-learning filter to one standard atmospheric pressure, when the manifold pressure sensor encounters no fault and the rotation speed of the engine is not zero; and set the initial value of the altitude correction coefficient self-learning filter to one standard atmospheric pressure, when the manifold pressure sensor encounters a fault.

5. The apparatus according to claim 4, wherein the enabling module is configured to:
determine the vehicle satisfies the preset self-learning enabling condition when the engine rotation speed is higher than a minimum recognizable rotation speed, the vehicle speed is higher than a preset threshold, and any one of first preset conditions is satisfied, wherein the first preset conditions include:

the manifold pressure sensor or the stepping motor encounters a fault;

the current altitude correction coefficient is less than 1, the vehicle is at a gas cut-off state or an idling state, and the vehicle speed is normal; and a throttle valve position is greater than an altitude self-learning threshold, and a throttle valve position sensor encounters no fault.

6. The apparatus according to claim 4, wherein the input value determining module is configured to:

set the input of the altitude correction coefficient self-learning filter to 800 hpa-900 hpa, when the manifold pressure sensor or the stepping motor encounters a fault;

set the input of the altitude correction coefficient self-learning filter to 1000 hpa-1100 hpa, when the manifold pressure sensor and the stepping motor encounters no fault, the current altitude correction coefficient is less than 1, and any one of two second preset conditions is satisfied, wherein the two second preset conditions include the vehicle is at a gas cut-off state; and a vehicle speed sensor encounters no fault, an idling state indicator is reset, and the vehicle speed is higher than a vehicle speed threshold; and set the input of the altitude correction coefficient self-learning filter to the quotient of a manifold pressure divided by a front-to-back pressure ratio of a throttle valve when none of the two second preset conditions is satisfied.

7. An apparatus for acquiring an altitude correction coefficient, comprising:

a processor; and a memory storing instructions executed by the processor, wherein the processor is configured to:

acquire an initial value of an altitude correction coefficient self-learning filter when a preset event for an engine has occurred, the preset event including one of a power-off event, a power-on event and an unexpected power-down event;

evaluate whether a vehicle satisfies a preset self-learning enabling condition, according to an engine rotation speed, a vehicle speed, and status information of designated devices, wherein the preset self-learning enabling condition is a condition of the vehicle in terms of the engine rotation speed, the vehicle speed, and the status information of designated devices;

enable the altitude correction coefficient self-learning filter when the vehicle satisfies the preset self-learning enabling condition;

determine an input of the altitude correction coefficient self-learning filter at least according to in accordance with operating states of a manifold pressure sensor and a stepping motor; and obtain a current altitude correction coefficient by self-learning the altitude correction coefficient, applying the altitude correction coefficient self-learning filter in accordance with the initial value of the altitude correction coefficient self-learning filter and the input of the altitude correction coefficient self-learning filter;

wherein, when the power-off event has occurred, acquiring the initial value of the altitude correction coefficient self-learning filter includes: evaluating whether the manifold pressure sensor encounters a fault after a first preset delay, when an engine ignition switch is off and the engine rotation speed is lower than a minimum recognizable rotation speed; setting the initial value of the altitude correction coefficient self-learning filter to a value of the manifold pressure sensor, when the manifold pressure sensor encounters no fault; and setting the initial value of the altitude correction coefficient self-learning filter to a previous output of the altitude correction coefficient self-learning filter, when the manifold pressure sensor encounters a fault;

wherein, when the power-on event has occurred, acquiring the initial value of the altitude correction coefficient self-learning filter includes: evaluating whether the manifold pressure sensor encounters a fault after a first preset delay, when an engine ignition switch is off and the engine rotation speed is lower than a minimum recognizable rotation speed; setting the initial value of the altitude correction coefficient self-learning filter to a value of the manifold pressure sensor, when the manifold pressure sensor encounters no fault; and setting the initial value of the altitude correction coefficient self-learning filter to a previous output of the altitude correction coefficient self-learning filter, when the manifold pressure sensor encounters a fault;

wherein, when the unexpected power-down event has occurred, acquiring the initial value of the altitude correction coefficient self-learning filter includes: evaluating whether the manifold pressure sensor encounters a fault when the engine is restored after the unexpected power-down event; setting the initial value of the altitude correction coefficient self-learning filter to a value of the manifold pressure sensor, when the manifold pressure sensor encounters no fault and rotation speed of the engine is zero; setting the initial value of the altitude correction coefficient self-learning filter to one standard atmospheric pressure, when the manifold pressure sensor encounters no fault and the rotation speed of the engine is not zero; and setting the initial value of the altitude correction coefficient self-learning filter to one standard atmospheric pressure, when the manifold pressure sensor encounters a fault.

* * * * *